(12) United States Patent
Goppelsröder et al.

(10) Patent No.: US 8,733,196 B2
(45) Date of Patent: May 27, 2014

(54) STANDARD GEAR UNIT, ASSEMBLY KIT AND DRIVE

(75) Inventors: Egon Goppelsröder, Philippsburg (DE); Eberhard Tüngler, Bruchsal (DE); René Richert, Riedseltz (FR)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 2865 days.

(21) Appl. No.: 10/516,142

(22) PCT Filed: Apr. 10, 2003

(86) PCT No.: PCT/EP03/03714
§ 371 (c)(1), (2), (4) Date: Nov. 29, 2004

(87) PCT Pub. No.: WO03/100296
PCT Pub. Date: Dec. 4, 2003

(65) Prior Publication Data
US 2005/0211008 A1 Sep. 29, 2005

(30) Foreign Application Priority Data

May 12, 2002 (DE) .................................. 102 56 752
May 29, 2002 (DE) .................................. 102 24 358

(51) Int. Cl.
*F16H 57/02* (2012.01)

(52) U.S. Cl.
USPC ....................................... 74/421 A; 74/606 R

(58) Field of Classification Search
USPC ................. 74/421 A, 606 R, 607; 310/89, 90
See application file for complete search history.

(56) References Cited

U.S. PATENT DOCUMENTS

| | | | | |
|---|---|---|---|---|
| 3,110,095 A | * | 11/1963 | Peickii | 74/607 |
| 3,134,333 A | * | 5/1964 | Nielsen | 417/423.3 |
| 5,501,117 A | | 3/1996 | Mensing et al. | |
| 6,386,764 B1 | * | 5/2002 | Moore et al. | 384/448 |
| 6,724,112 B2 | * | 4/2004 | Chihara et al. | 310/89 |

FOREIGN PATENT DOCUMENTS

| | | |
|---|---|---|
| DE | 100 28 046 | 12/2001 |
| DE | 100 49 883 | 4/2002 |
| EP | 0 617 214 | 9/1994 |
| EP | 0 947 729 | 10/1999 |
| WO | WO 2004/006415 | 1/2004 |

* cited by examiner

*Primary Examiner* — William C Joyce
(74) *Attorney, Agent, or Firm* — Kenyon & Kenyon LLP

(57) ABSTRACT

In a standard gear unit, which, in a first variant, is implemented with an output-side bearing and an outgoing shaft, and which, in a second variant, is able to be implemented with an intermediate flange inserted at the bearing position of the output-side bearing, the intermediate flange is formed such that, with an associated, differently formed outgoing shaft, a robot interface or flange block interface is able to be formed on the output side.

6 Claims, 15 Drawing Sheets

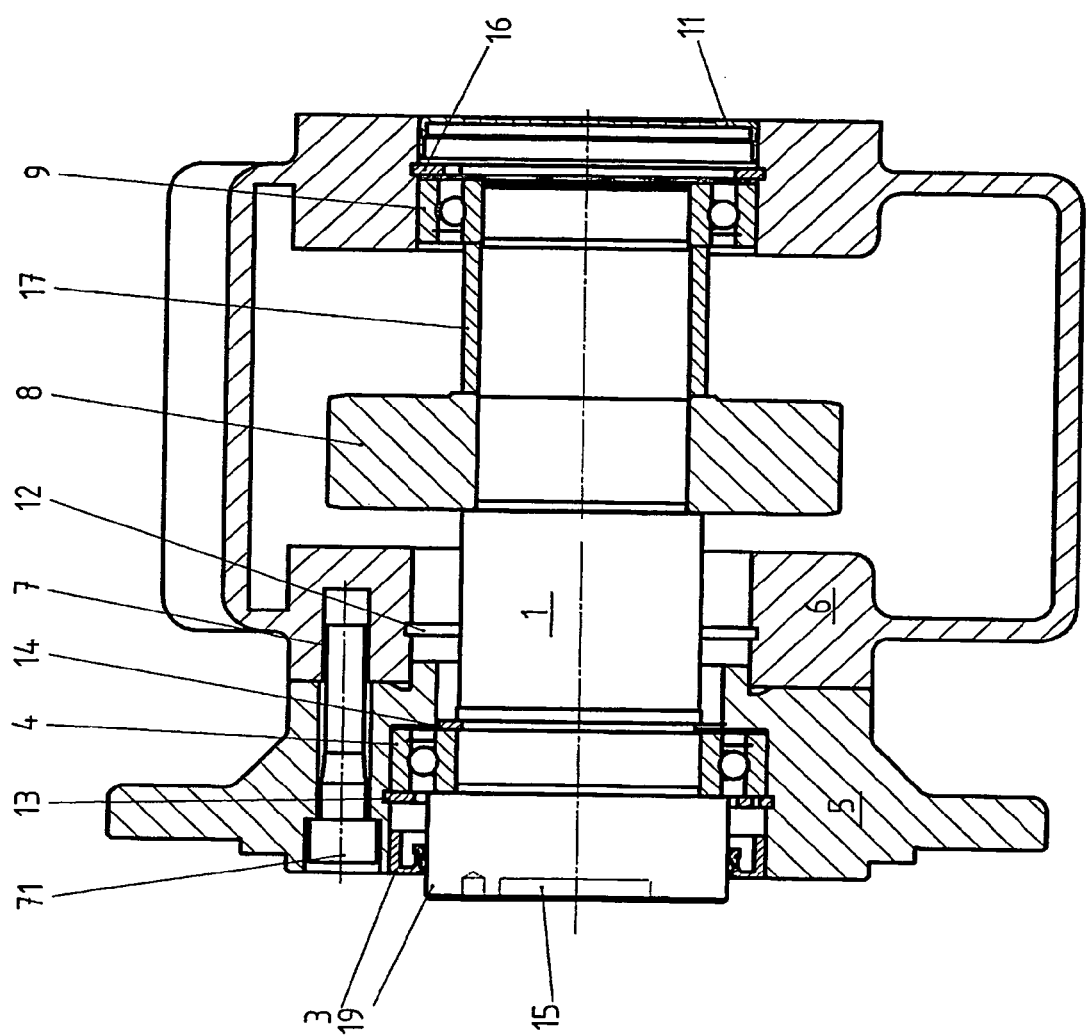

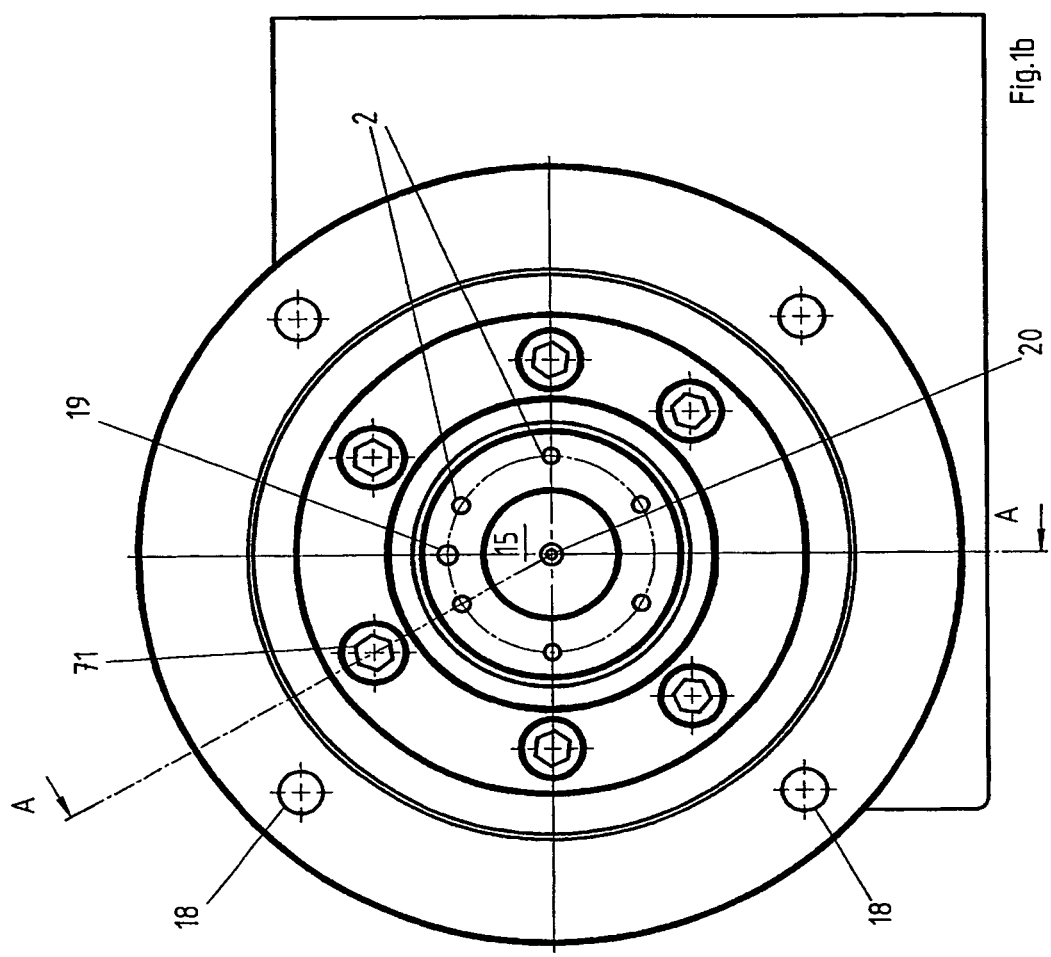

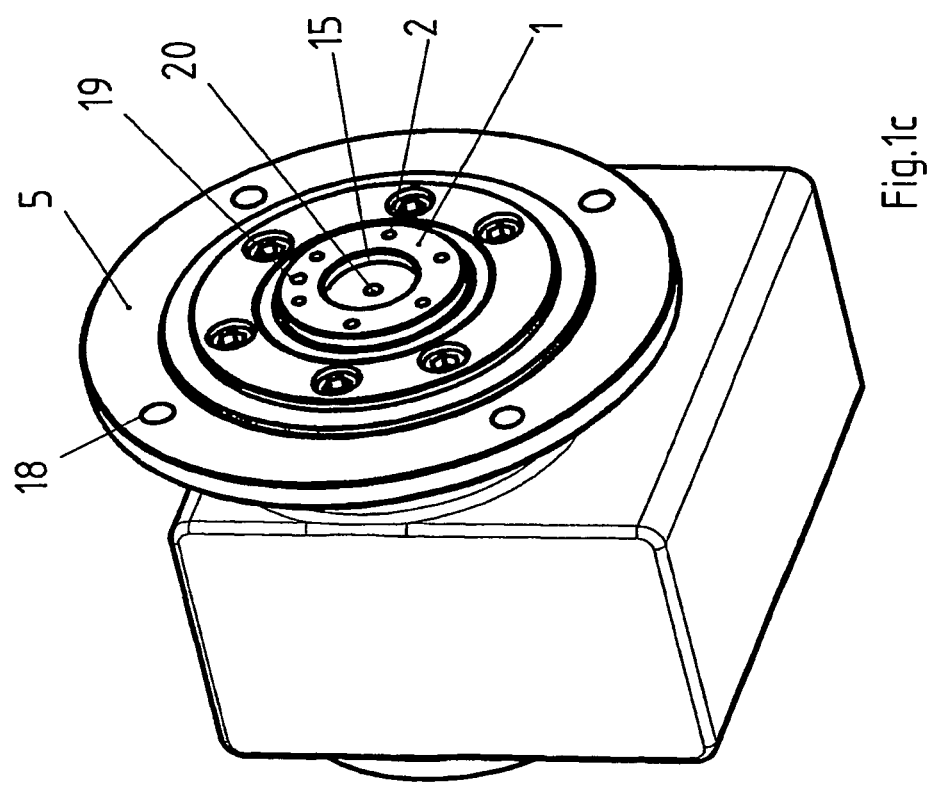

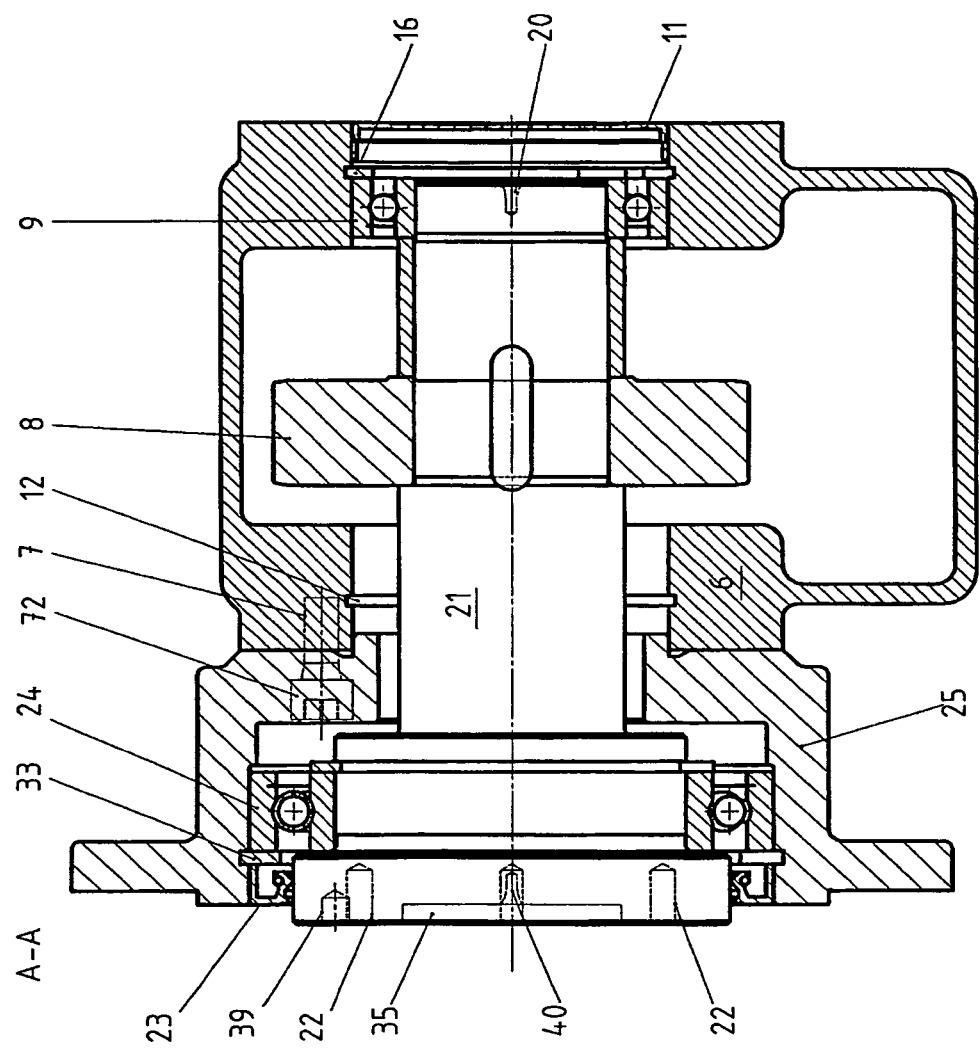

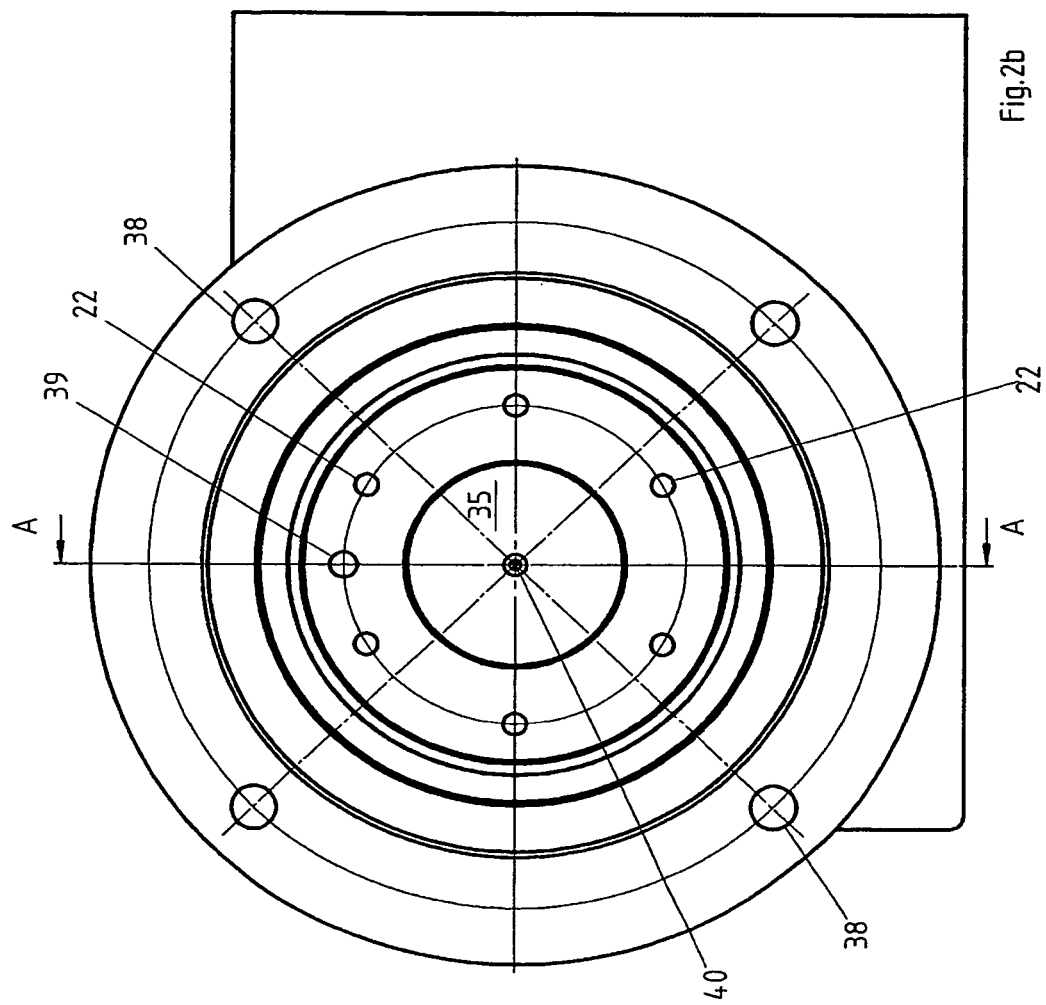

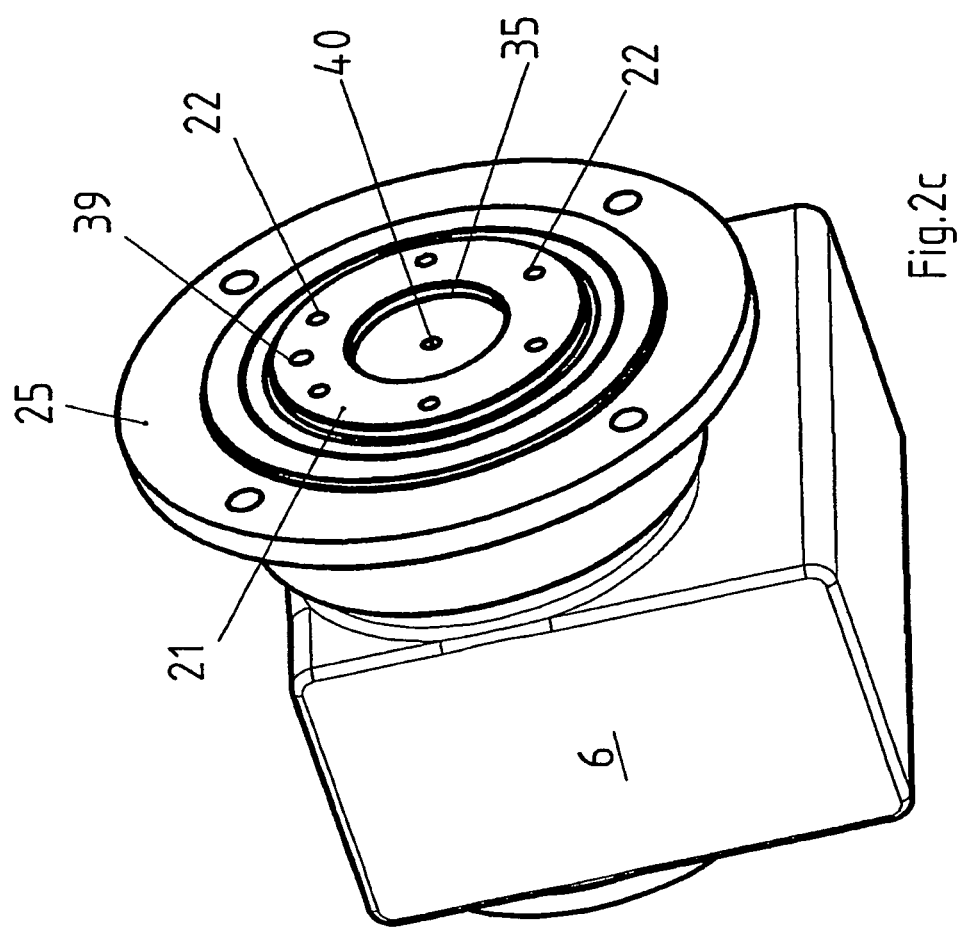

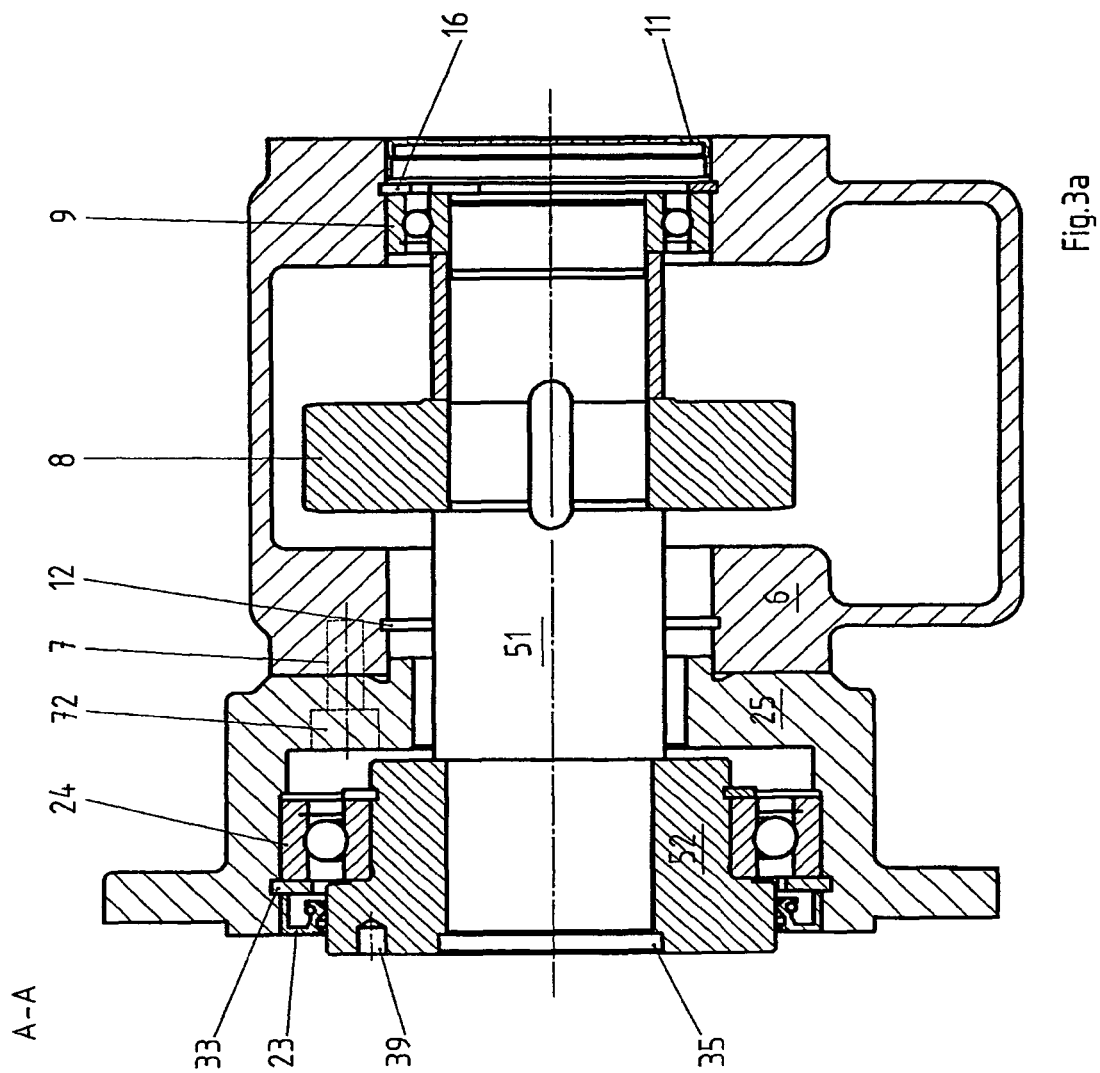

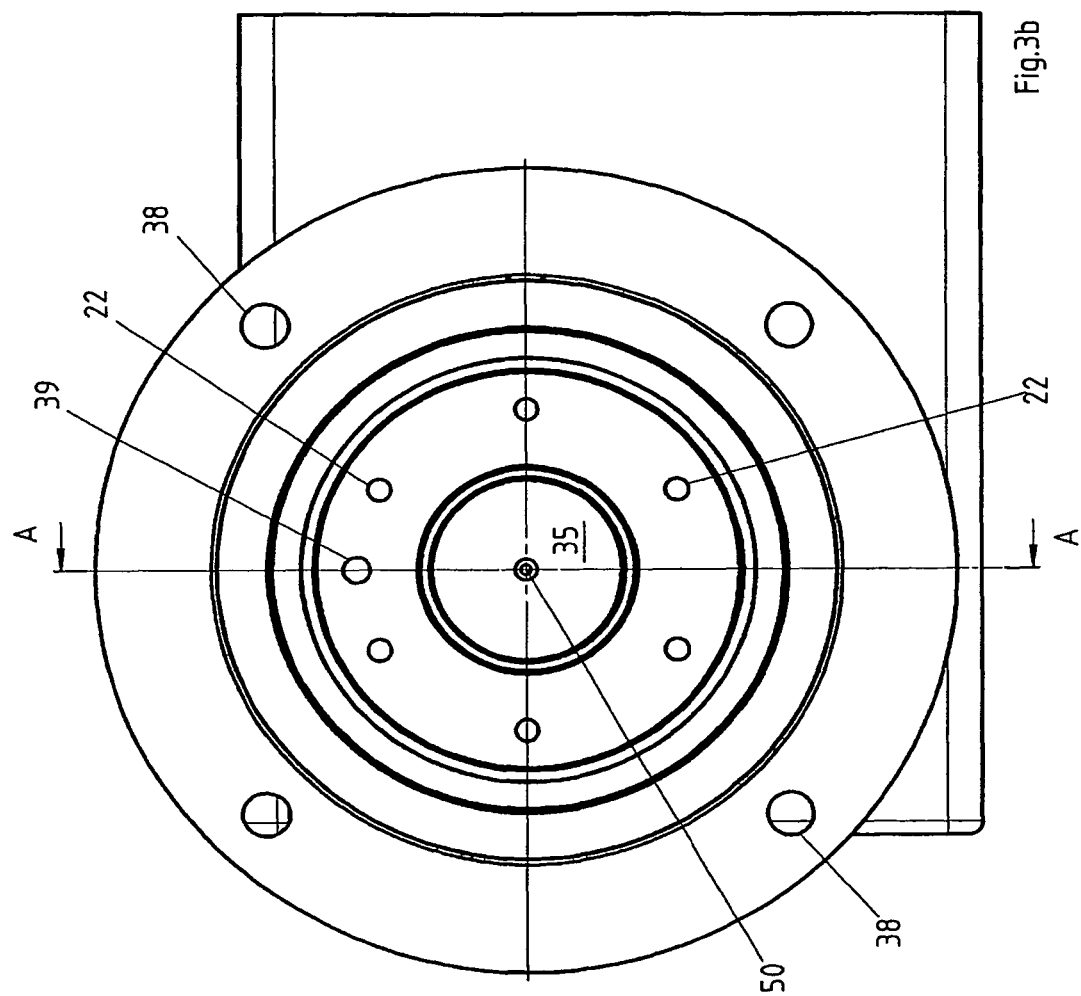

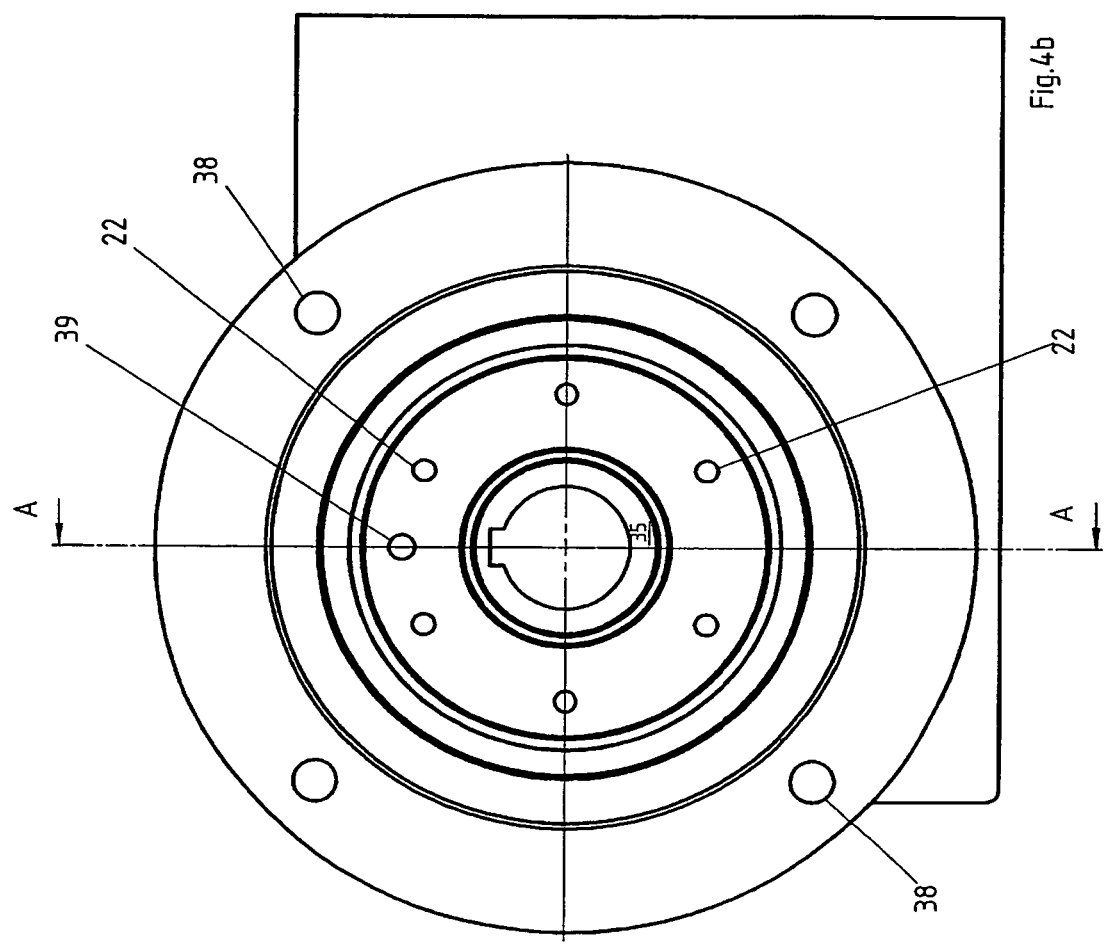

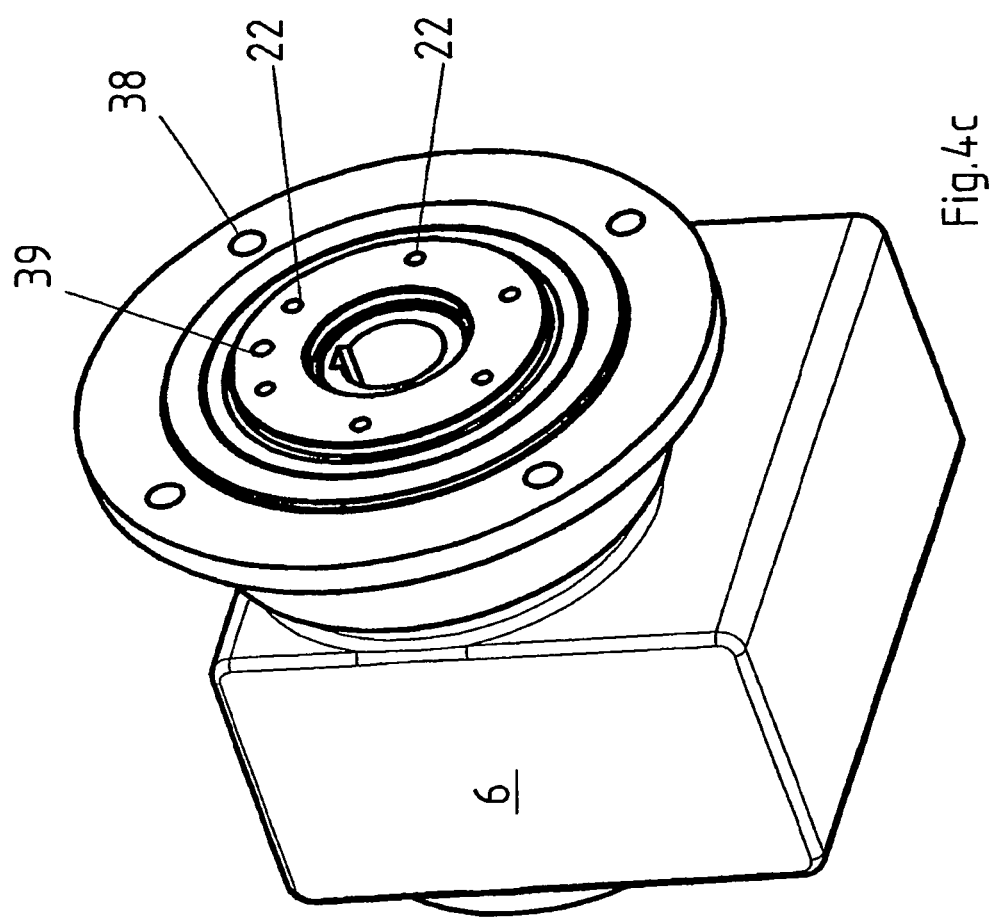

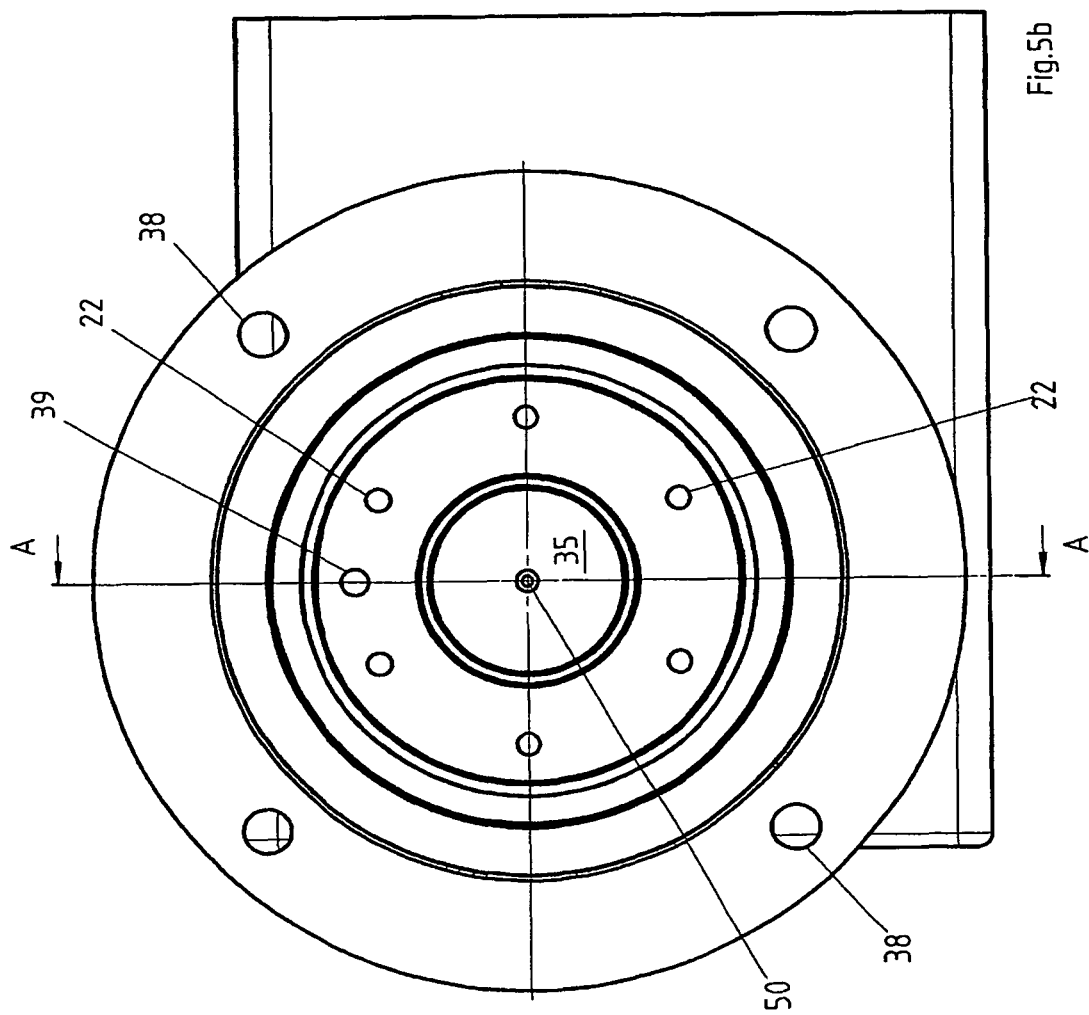

STANDARD GEAR UNIT, ASSEMBLY KIT AND DRIVE

FIELD OF THE INVENTION

The present invention relates to a standard gear unit, an assembly kit and a drive.

BACKGROUND INFORMATION

German Published Patent Application No. 100 28 046 describes a planetary gear unit that has a shaft butt on the output side.

In Standard EN ISO 9409-1, a mechanical interface is described which is able to be provided on the output side when working with planetary gear units for industrial robots and is intended for such. However, such planetary gear units are complicated and costly to produce.

Herein, primarily helical gear units or also parallel shaft helical gear units are designated as standard gear units. However, gear units such as mitre gear units, helical-bevel gear units, helical-worm gear units, spiroplan gear units and hypoid gear units may also be added to such standard gear units, as long as they contain no planetary gear stages or cyclo gear stages. Such standard gear units are believed to be well known to one skilled in the art from textbooks and from Internet pages of market leaders in the field of industrial drive engineering such as SEW-EURODRIVE GmbH & Co. KG.

SUMMARY

Example embodiments of the present invention may provide standard gear units which may be usable in a more compact form and nevertheless may be cost-effective, e.g., in expanding an existing production series.

Features of an example embodiment of the present invention with respect to the standard gear unit, thus a gear unit without a planetary gear stage, include that at least one housing part and an outgoing shaft supported in a bearing on the output side are included, a shaft seal ring on the output side being provided for sealing on the output side. The shaft seal ring on the output side and the bearing on the output side are provided between the outgoing shaft and an intermediate flange. This intermediate flange is provided in the housing part such that: for positioning, it abuts against a bore suitably implemented as a bearing seat and seat for the shaft seal ring; for power and/or torque transmission, it is secured to the housing part by a releasable connection; and for connection to a non-rotating part of a device to be driven, it is machined such that it has connection possibilities such as drilled holes, tapped holes, etc. The radial distance of the releasable connection to the axis of rotation of the outgoing shaft is smaller than the diameter of the inner ring and/or outer ring of the bearing on the output side and/or the inside diameter of the shaft seal ring on the output side.

Given an existing production series of standard gear units in which, on the output side, a housing part is provided with a bore for accommodating a bearing seat and a seat of a shaft seal ring, an intermediate flange may be provided which is able to be mounted in the indicated bore and centered there. In addition, the intermediate flange is able to be secured to the housing part in a connecting arrangement, such as a bore, etc. Thus, the connecting arrangement, such as a bore, something similar, etc., and the bore indicated above have, on one hand, the function of accommodating and securing the intermediate flange, and on the other hand, the function of accommodating a shaft seal ring, a bearing for a corresponding outgoing shaft, and e.g., the bore has the function of securing on the customer side, thus, securing a device driven by the standard gear unit. Therefore, at least two different variants of standard gear units are able to be manufactured.

It is possible to produce a variant having an intermediate flange, in which the bearings have higher load ratings, e.g., C & Co characteristic numbers, the outgoing shafts have a large cross-section on their output-side end, e.g., a much larger cross-section than for the variant without an intermediate flange, and the total drive may have an extremely compact design. In addition, high output torques may be rendered possible, and the power flow collective on the customer side may be optimally adaptable.

Moreover, the outgoing shaft may be able to be implemented on the output side in accordance with EN ISO 9402-1. This may permit the connection of all correspondingly standardized devices. Therefore, all aspects of EN ISO 9402-1 may also be attainable. For example, standard gear units may thus be usable as drives for industrial robots and as drives for devices which have a mechanical interface in accordance with EN ISO 9402-1. The mechanical design according to an example embodiment of the present invention for attaining standard gear units that have little backlash or are even backlash-free, standard gear units may be able to be realized such that they are also usable in industrial robots. An aspect hereof is a cost-effective design, since a standard gear unit may be implemented much more inexpensively than a planetary gear unit of the same performance.

An example embodiment of the present invention may provide that, given an existing production series of standard gear units, by adding a few parts such as an intermediate flange and additional outgoing shaft, it may be possible to manufacture the variant with an intermediate flange. Thus, the expenditure, the inventory held in storage, the stock on hand and further costs may only be insignificantly increased.

A first variant with an intermediate flange may be able to be produced in which, given the same size or model and requirement on the customer side, thus, requirement of the driven device, the bearings may have a longer service life than for the second variant without an intermediate flange. An example embodiment of the present invention may exhibit a higher flexural fatigue strength, a greater resistance to torsion and higher tilting moment.

Moreover, reliability may be increased, and the costs for a drive may also be reduced because a smaller size may be selected for many applications for which the indicated mechanical data are otherwise decisive for the selection of a larger standard gear unit, e.g., as viewed from the standpoint of rated torque.

It may be provided that the drive requires very little space. In this context, it may be provided that the axial length which must be available to the drive in the machine or installation is defined not only by the mechanical length of the drive, but also the mounting makes use of the overall length. In an example embodiment of the present invention, only a particularly small overall length may be necessary, because the drive may be inserted from the side. In a standard conventional drive, however, there is an outgoing shaft butt sticking far out. Thus, a correspondingly great deal of overall length is necessary for installation in the customer's device. Therefore, an example embodiment of the present invention may offer a particularly compact drive that may require little axial overall length.

In an example embodiment, the bore, suitably implemented as a bearing seat and seat for the shaft seal ring, is provided with a groove which, after disassembly of the intermediate flange, is suitably designed for accommodating a retaining ring for a bearing. High manufacturing precision may be maintained for both variants. Therefore, the housing part may always be manufactured substantially identically and may be usable for both variants. This may reduce manufacturing and storage costs considerably. The total administration expenditure may therefore also be reduced.

In an example embodiment, the connection is implemented by fixing screws, and after disassembly of the intermediate flange, the connection, such as a tapped hole, fastening screws, seating, fitting-in-place, etc., are usable for the connection to a device that is releasably connectable on the output side and is able to be driven by the outgoing shaft. In this case, it may be provided that the connection is usable for both variants. In addition, industrially customary arrangements may be used, which means that costs may be reduced.

In an example embodiment, the intermediate flange has an arrangement for producing a releasable connection, such as a bore, etc., to a device that is releasably connectable on the output side and is able to be driven by the outgoing shaft. This may provide that the connection on the customer side is feasible on a larger diameter than in the case of the housing part and the variant without an intermediate flange. This may result in advantages with respect to the mechanical characteristic quantities indicated.

In an example embodiment, the connection of the intermediate flange to the housing part may include an arrangement for the connection, such as fixing screws, tapped hole, etc. This may provide that it is possible to use industrially customary devices, thereby reducing costs. In addition, the interface thus produced is also usable for connecting the customer device to the second variant, thus the standard gear unit without an intermediate flange.

In an example embodiment, the outgoing shaft is connectable with form locking to the device, able to be connected on the output side to the standard gear unit, and has a bore for the centering. The length of the accommodation thereby produced may be smaller than the diameter of the accommodation. This may provide that the indicated mechanical characteristic quantities, e.g., the tilting moment and the flexural fatigue strength, may have desirable values, e.g., values which are more desirable than for the variant without an intermediate flange.

In an example embodiment, the outgoing shaft has a mechanical interface in accordance with EN ISO 9409-1 on the output side. Devices having a standardized interface may be able to be connected, and associated advantages may be attainable.

In an example embodiment, the standard gear unit may be implemented such that the outgoing shaft is able to be installed in the standard gear unit in an axial direction, thus is insertable into the housing part in the axial direction during assembly, and in so doing is able to be mounted. This arrangement may be produced with little expenditure.

In an example embodiment, the outgoing shaft has an offset, thus a change in diameter, in the region of the bore suitably implemented as a bearing seat and seat for the shaft seal ring. This may provide that, depending on the configuration, the outgoing shaft for the variant with an intermediate flange and the outgoing shaft for the variant without an intermediate flange are each able to be produced in one piece, or the first-named outgoing shaft is able to be produced using the last-named outgoing shaft by force fitting or other connection of an outgoing-shaft section.

In an example embodiment, a bearing is provided for support for the outgoing shaft at its non-output-side end in the housing part, which is connected to the intermediate flange. It may be possible to use the same housing part, thus the housing of the gear unit is realizable in one piece.

In an example embodiment, the outgoing shaft for the first variant, thus with an intermediate flange, is able to be produced from the outgoing shaft for the second variant, thus without an intermediate flange, by fixedly connecting a flange part. This connection may be realized such that finish-machining of the first outgoing shaft thus produced may not be necessary. Rather, the previous machining of the second outgoing shaft and of the flange part may be carried out separately. Nevertheless, sufficient precision may be attainable, e.g., for the first variant.

Features of an example embodiment of the present invention with respect to the assembly kit for a production series of standard gear units, thus gear units without planetary gear stage, having at least one size defined by its shaft height, include that for each size, the assembly kit includes at least: one housing part; a first toothing part connectable to an outgoing shaft; at least one further toothing part able to be forced into engagement with the first toothing part; and further parts which are able to be brought into connection and/or contact with the further toothing part, e.g., for forming a gear stage and/or a plurality of gear stages of the standard gear unit. For producing a first variant of standard gear units within the size, the assembly kit includes: a first bearing on the output side; a first outgoing shaft supported in the bearing on the output side and in a further bearing, e.g., in a further bearing arranged on the input side; an intermediate flange; and a first shaft seal ring on the output side for sealing on the output side. In the first variant, the first shaft seal ring on the output side and the first bearing on the output side are provided such that between the first outgoing shaft and the intermediate flange the outgoing shaft is supported and sealed in the intermediate flange. This intermediate flange is provided in the housing part and being releasably connectable to it at an interface such that: or positioning, thus e.g., for centering, it abuts against a bore, suitably implemented as a bearing seat and seat for the shaft seal ring, in the housing part; and for the transmission of power and/or torque, it is secured to the housing part by a releasable connection encompassed by the interface. A radial distance of the releasable connection to the axis of rotation of the outgoing shaft, e.g., at least the smallest radial distance of the connection, is smaller than the diameter of the inner ring and/or outer ring of the first bearing on the output side and/or of the inside diameter of the first shaft seal ring on the output side. For producing a second variant of standard gear units within the size, the assembly kit includes: no intermediate flange; the same housing as the first variant; the same toothing parts as the first variant; a second shaft seal ring on the output side for sealing on the output side; and a second bearing on the output side. In the second variant, the second shaft seal ring on the output side and the second bearing on the output side are provided between a second outgoing shaft and the housing part at the bore, suitably implemented as bearing seat and seat for the shaft seal ring, of the first variant. On the housing part, a first arrangement, e.g., tapped holes 2, 22, is provided for producing a releasable connection to a device that is arranged on the output side and is able to be driven by the standard gear unit. At the second outgoing shaft, an arrangement, e.g., featherkeys, is provided for producing a releasable connection of the outgoing shaft to a rotatable part of the device that is arranged on the output side and is able to be driven by the standard gear unit. The radial distance, e.g., the smallest radial distance, of the first arrangement to the axis of rotation of the second outgoing shaft is greater than the diameter of the outer ring of the second bearing on the output side and the outside diameter of the second shaft seal ring on the output side.

Given an existing production series of standard gear units in which, on the output side, a housing part is provided with a bore for accommodating a bearing seat and a seat of a shaft seal ring, an intermediate flange is able to be provided which may be inserted into the indicated bore and centered by it. In addition, the intermediate flange is able to be secured to the housing part using a connection such as bores, fastening screws, fitting in place, etc. Therefore, the connection and the above-indicated bore for the outgoing shaft of the standard gear unit have, on one hand, the function of accommodating and securing the intermediate flange, and on the other hand, the function of accommodating a shaft seal ring, a bearing for a corresponding outgoing shaft, and, e.g., the bore has the function of securing on the customer side, thus securing a device driven by the standard gear unit. Therefore, at least two different variants of standard gear units are able to be manufactured.

By suitable forming to shape, the intermediate flange may be able to be fit into the bore which is provided for the outgoing shaft of the standard gear unit without an intermediate flange, for this bore may be precisely manufactured, and therefore may offer the possibility of precisely positioning the outgoing shaft.

Moreover, the housing part also has drill holes for the introduction of fastening screws for the connector of the device to be driven and able to be provided on the output side, thus, e.g., the customer device. The intermediate flange may be configured such that it is able to be secured at these drill holes. Therefore, no additional devices or machining operations may be necessary for preparing the connection of the intermediate flange.

It may be possible to produce a variant having an intermediate flange, in which the bearings have higher C & Co characteristic numbers, the outgoing shafts have a large cross-section at their output-side end, e.g., a much larger cross-section than for the variant without an intermediate flange, and the total drive may have an extremely compact design. In addition, high output speeds may be rendered possible, and the power-flow collective on the customer side may be optimally adaptable.

Furthermore, the outgoing shaft may be able to be implemented on the output side in accordance with EN ISO 9402-1. This may permit the connection of all correspondingly standardized devices. Therefore, aspects of EN ISO 9402-1 may also be attainable, e.g., standard gear units may thus be usable as drives for industrial robots and as drives for devices which have a mechanical interface in accordance with EN ISO 9402-1. The mechanical design according to an example embodiment of the present invention for attaining standard gear units that have little backlash or are even backlash-free, standard gear units may be able to be realized such that they may also be usable in industrial robots. An aspect hereof is a cost-effective implementation, since a standard gear unit may be implemented much more inexpensively than a planetary gear unit of the same size and output.

An example embodiment of the present invention may also provide that, given an existing production series of standard gear units, by adding a few parts such as an intermediate flange and an additional outgoing shaft, it may be possible to manufacture the variant with an intermediate flange. Thus, the expenditure, the inventory held in storage, the stock on hand and further costs may only be insignificantly increased.

A variant having an intermediate flange may be able to be produced for which, given the same size or model and requirement on the customer side, thus, requirement of the driven device, the bearings may have a longer service life than for the variant without an intermediate flange. An example embodiment of the present invention may exhibit a higher flexural fatigue strength, a greater resistance to torsion and higher tilting moment.

Moreover, reliability may be increased, and the costs for a drive may also be reduced because a smaller size may be selected for many applications for which the indicated mechanical data are otherwise decisive for the selection of a larger standard gear unit, e.g., as viewed from the standpoint of rated torque.

In an example embodiment, the first outgoing shaft includes the second outgoing shaft. This may provide that the first outgoing shaft is able to be produced using the second outgoing shaft. It may only be necessary to connect to the second outgoing shaft, a small supplementary part, thus a flange part, which may be produced quickly, easily and inexpensively. Therefore, the outgoing shafts that may be present anyway in the production series of the second variant, thus the standard gear unit without an intermediate flange, may have a double use.

In an example embodiment, the first outgoing shaft is able to be produced from the second outgoing shaft by connecting the latter to a further outgoing-shaft section, thus a flange part. This may provide that it may only be necessary to manufacture the further outgoing-shaft section and the intermediate flange, and it may already be possible to offer the mechanical interface for industrial robots.

In an example embodiment, the connection may be provided by bonding, welding and/or force fitting, etc. The connection may be executable precisely and inexpensively.

In an example embodiment, the further outgoing-shaft section is implemented with toothing, e.g., knurling. The toothing, when pressed into a corresponding bore in the first outgoing shaft or into an outgoing shaft implemented as a hollow shaft, is able to be pressed in in a cutting and/or deforming fashion. This may provide that shafts existing in the production series are able to be used easily and inexpensively.

Further aspects are described herein.

LIST OF REFERENCE NUMERALS 1 outgoing shaft
2 mounting bore
3 shaft seal ring
4 bearing
5 intermediate flange
6 housing part
7 connecting tapped hole
8 toothing part
9 bearing
11 screw cap
12 groove for retaining ring
13 retaining ring
14 retaining ring
15 bore
16 retaining ring
17 spacer tube
18 cylindrical bore
19 centering bore
20 centering
21 outgoing shaft
22 tapped hole
23 shaft seal ring
24 bearing
25 intermediate flange 33 retaining ring
35 bore as accommodation
38 cylindrical bore
39 centering bore
40 centering
50 centering
51 outgoing shaft
52 flange part
53 outgoing shaft in hollow-shaft construction
54 taper roller bearing
55 taper roller bearing
71 fastening screw
72 fastening screw

BRIEF DESCRIPTION OF THE DRAWINGS

FIGS. 1a, 1b and 1c illustrate an example embodiment of the present invention.
FIGS. 2a, 2b and 2c illustrate an example embodiment of the present invention.
FIGS. 3a, 3b and 3c illustrate an example embodiment of the present invention.
FIGS. 4a, 4b and 4c illustrate an example embodiment of the present invention.
FIGS. 5a, 5b and 5c illustrate an example embodiment of the present invention.

DETAILED DESCRIPTION

Figure 3C:
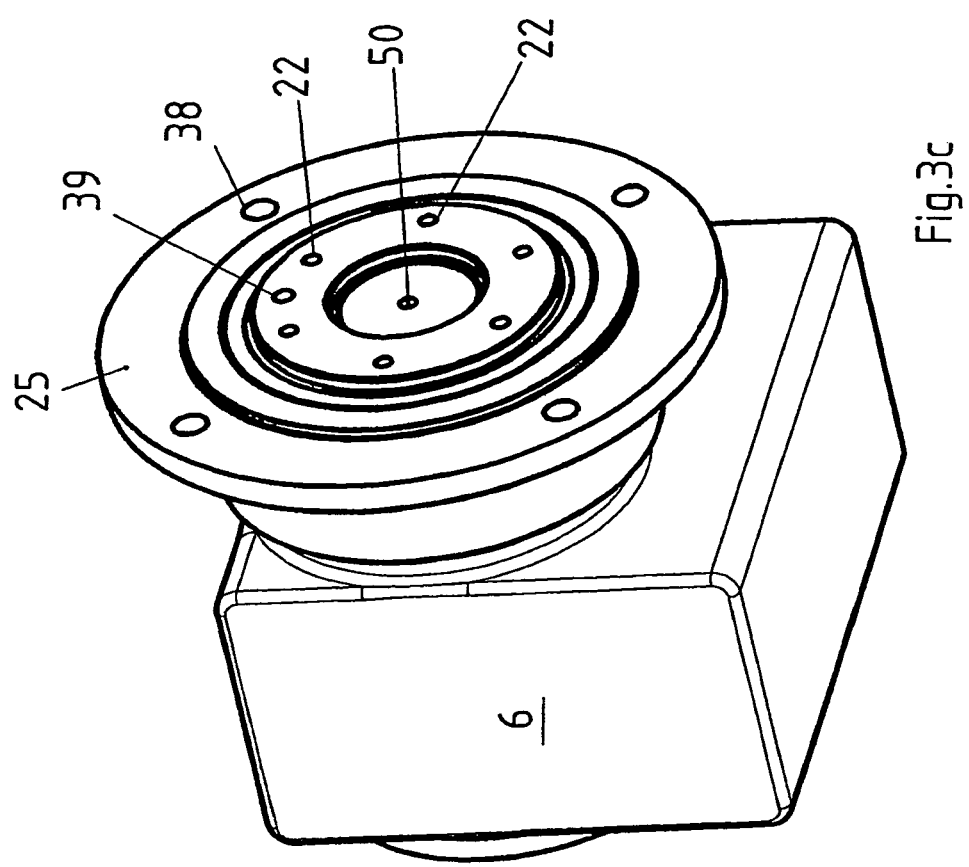

Example embodiments of the present invention are explained in more detail with reference to the appended Figures.

FIGS. 1a, 1b, 1c illustrate an exemplary embodiment according to the present invention. In this context, the standard gear unit has an outgoing shaft 1 which is driven via toothing part 8 connected to it. As illustrated in FIG. 1a, this toothing part 8 is implemented as a gear wheel and is connected to outgoing shaft 1 by featherkeys.

Housing part 6 may be constructed in one piece. In other exemplary embodiments of the present invention, housing part 6 is also able to be formed completely differently. Example embodiments of the present invention may be usable when working with greatly differing gear units for the output-drive sector.

Outgoing shaft 1 has a large maximum diameter at its end on the output side. The outgoing shaft is not supported in the housing, i.e., housing part 6, but in an intermediate flange 5 using bearing 4 on the output side, and is sealed from the surroundings by shaft seal ring 3. In intermediate flange 5, a retaining ring 13 is provided in an associated groove which limits bearing 4 in its axial position. A retaining ring 14 for axially securing the inner ring of bearing 4 is provided in outgoing shaft 1.

One skilled in the art should recognize the difficulty, that intermediate flange 5 and housing 6 may need to be joined very precisely to one another, and the manufacturing quality when machining intermediate flange 5 and housing 6 may need to be very high, so that bearing 4 and bearing 9 sit sufficiently precisely for the correct alignment of outgoing shaft 1.

However, example embodiments of the present invention may provide advantages which outweigh disadvantages. For example, by the use of the intermediate flange, bearing 4 may be implemented to be very large, as becomes even clearer, e.g., also by the following explanations. For example, intermediate flange may be provided to be suitably large. Therefore, a suitably great torque is transmittable, and it is even possible to connect devices to be driven on the output side, thus customer devices, which have a much greater maximum permissible torque on the input side than the driving standard gear unit. Consequently, it may also be possible to drive very large sizes of customer devices using the standard gear unit.

Moreover, the distance between bearing 4 and bearing 9 may be selected to be very large, and therefore the output may be loadable with greater transverse forces. As becomes even clearer in the following as well, intermediate flange 5 is exchangeable for another intermediate flange, so as to allow for a different outgoing shaft. Therefore, various connection possibilities on the output side may be provided using the same gear unit, without having to exchange housing 6. This may also hold true for the remaining gear-unit parts such as toothing parts, etc. In particular, all preliminary stages and the input of the gear unit may be retained. Thus, with a small variety of parts and therefore a small storage area as well as lower administration expenditure, it may be possible to offer a multitude of different connection possibilities for the customer.

Mounting bores 2 and 18 are used for introducing screws or corresponding devices for securing the device on the output side. Mounting bores 18 are cylindrical. Bores 2 are implemented as tapped holes. Bore 19 is provided as a centering bore. Opening 20 is used for centering the shaft during manufacture. Mounting bores 2 permit the transfer of torque to the customer shaft, and mounting bores 18 are used for securing the non-rotating parts of the customer device relative to housing 6. Bore 15 is used for accommodating and centering the customer shaft, thus the shaft that is connectable on the output side and is driven by the standard gear unit. As illustrated in FIGS. 1a and 1c, the formation of intermediate flange 5 may make it possible to provide mounting bores 18 on a very large diameter.

Intermediate flange 5 bears a bore 18 for connecting and securing the housing parts of the device on the output side, thus on the customer side. Intermediate flange 5 is fastened to housing part 6 by fastening screws 71 in connecting tapped holes 7. The housing part has a groove 12 for a retaining ring.

Outgoing shaft 1 is supported at its other end via bearing 9 in housing part 6, the outer ring of bearing 9 being held in its axial position by retaining ring 16.

Screw cap 11 seals the standard gear unit from the surroundings.

Thus, the standard gear unit illustrated in FIGS. 1a, 1b and 1c has an interface in accordance with EN ISO 9409-1 on the output side. In particular, the bore diagram or pattern is suitably implemented. The interface indicated is a mechanical interface for industrial robots. It may be complicated and expensive, and may therefore be conventionally provided only in the case of the planetary gear unit. Moreover, the requirements when working with robots with respect to compactness and suitable transverse force may be great, the interface in accordance with the standard being correspondingly high-performance.

This complicated and costly interface may be provided with a standard gear unit, thus, for example, a helical gear unit, mitre gear unit, e.g., a bevel gear unit, spiroplan gear unit, etc. The costs and the outlay arising with the offering of the interface may be extremely low, for a conventional standard gear unit may be altered in simple fashion on the output side in the type and use. For example, only the outgoing shaft may be exchanged. The bearing on the output side, the shaft seal ring on the output side, etc., are removed. The components, e.g., intermediate flange 5 and outgoing shaft 1, are used. Therefore, the outlay and costs that may have been necessary in conventional systems may be avoided, and certain advantages may be attainable using a standard gear unit.

In example embodiments of the present invention: inexpensive standard gear units may be usable for robots; it may be possible to offer a large cross-section of the outgoing shaft toward the device to be driven; bearings having higher C & Co characteristic numbers may be incorporated; a more compact construction may be feasible, because the transfer of torque to the device to be driven may require less space; higher torques in the case of the slaving may be provided; the customer may be able to plan its power-flow collective in optimized fashion; the bearing may have a longer service life; the flexural fatigue strength of the outgoing shaft may be increased; greater torsional stiffness may be provided; a higher, maximum permissible tilting moment may be provided; reliability may be increased; in certain applications, a smaller size of the standard gear unit may be usable when the relevant mechanical variables permit it; and the axial eccentricity may be improved, and therefore a more precise positioning may be attainable during the driving operation.

In other applications, however, a gear unit having a shaft shank on the output side may be necessary. In an exemplary embodiment according to the present invention, this form of the output-side interface may be produced as well. To that end, housing part 6 then has a groove 12 which, in an exemplary embodiment of the present invention according to FIG. 1, has no active mechanical function.

After removal of outgoing shaft 1 and intermediate flange 5, housing part 6 is provided, namely, for accommodating a bearing and shaft seal ring. Groove 12 is provided for the associated retaining ring for axially securing this incorporated bearing. Consequently, housing part 6, and the entire remaining standard gear unit as well, is able to be provided for various interfaces on the output side, without housing part 6 and also the entire remaining standard gear unit having to be altered.

The design and dimensioning of housing part 6 may be important in this connection, for it offers connecting tapped hole 7 as accommodation for intermediate flange 5. After disassembly of intermediate flange 5, this interface for producing a connection is, however, the output-side interface for the connection to the non-rotating parts of the driven device, such as housing parts or the entire housing, thus the device of the customer. Therefore, connecting tapped hole 7 has a double function depending on the output-side variant of the standard gear unit.

The releasable connection includes the connecting tapped holes in housing part 6 and makes it possible to produce a connection by screwing in fastening screws 71.

The double function of the bearing seat and the shaft-seal-ring seat present in the region of groove 12 may also be important for the other, above-mentioned variant. The reason is that the region of the bearing seat and the shaft-seal-ring seat forms a seat for accommodating and precisely centering the intermediate flange. For example, a shaft-seal-ring seat may always be machined with suitable precision. Therefore, for intermediate flange 5, the region of the bearing seat and the shaft-seal-ring seat is provided for the positioning. The indicated region is manufactured precisely and highly accurately for both variants. That is why housing part 6 may be usable, unaltered, in both variants.

FIGS. 2a, 2b and 2c illustrate exemplary embodiment according to the present invention, in which output-side bearing 24 rests on a larger diameter than connecting tapped hole 7.

In other exemplary embodiments of the present invention, the inside diameter of bearing 24, i.e., the diameter of the inner-ring bearing seat of bearing 24, is even larger than the largest radial distance of connecting tapped hole 7, for bearing 24 is loaded by completely different forces than in example embodiments in which bearing 24 rests on a smaller diameter than connecting tapped hole 7 like, for example, in example embodiments according to FIG. 1a, e.g. To that end, bearing 24 may be specially designed and implemented. Consequently, it may even be possible to connect output-side devices which belong to a larger size, thus are able to be driven with more torque, e.g., with at least twice as much torque, than the gear unit hereof may be able to deliver, because its maximum permissible torque would be exceeded.

It is also provided in the case of FIGS. 2a, 2b and 2c that bearing 24 sits on a larger diameter than the region arranged around groove 12 and provided for accommodating the bearing and the shaft seal ring. The inside diameter of bearing 24 is larger than the diameter of the bore in housing part 6 which represents the output-side opening in housing part 6 for outgoing shaft 1.

For centering the output-side device having a shaft, also hereinafter called customer shaft, in an exemplary embodiment of the present invention illustrated in FIG. 1, accommodation or bore 15 in outgoing shaft 1 is implemented such that the length of accommodation 15 is smaller than the diameter of accommodation 15. The slaving is implemented by a form-locking connection 19. Therefore, a surface support is provided on the customer side.

However, in the other above-mentioned variant without an intermediate flange, the customer shaft is accommodated such that the length of the accommodation is greater than the diameter of the accommodation. In this case, an axial stop is used for the axial positioning of the accommodation with respect to the standard gear unit. The slaving is implemented with form locking. However, friction locking is also usable for the slaving in other variants.

In an exemplary embodiment of the present invention as illustrated in FIGS. 2a, 2b, 2c, shaft seal ring 23 is configured to be larger than in FIGS. 1a, 1b, 1c.

In an exemplary embodiment of the present invention as illustrated in FIGS. 2a, 2b, 2c, outgoing shaft 21 is again implemented as a solid shaft which, because of the larger output-side diameter, is supported in a larger bearing 24 using a correspondingly larger retaining ring 33.

Tapped hole 22 is used for securing the rotating part of the customer device to be connected, the outgoing shaft including a suitably large bore 35 as accommodation for the customer shaft. Cylindrical bores 38 and centering bore 39 are again implemented in accordance with the standard, though on a larger diameter than in FIGS. 1a, 1b, 1c.

Intermediate flange 25 is implemented with a larger diameter on the output side. However, on the input side it has the same interface to housing part 6.

FIGS. 3a, 3b, 3c illustrate an exemplary embodiment of the present invention corresponding to FIGS. 2a, 2b, 2c. In this case, the outgoing shaft is implemented in two parts by fixedly joining a flange part 52 to an outgoing shaft 51. Therefore, the outgoing shaft may be produced even more simply and cost-effectively, because not much material has to be machined during manufacture. Flange part 52 offers the large diameter and is able to be manufactured with not much material to be machined. Thus, further possibilities for economizing may be provided and attained relative to the outgoing shaft illustrated in FIG. 2a. In addition, a further interface is therefore created, which permits the connection of various flange parts 52 and therefore makes it possible to allow for different variants of devices to be connected on the output side.

Flange part 52 is welded to outgoing shaft 51. However, force fitting is also possible as a connection.

The customer device is able to be precisely connected using centering 50.

Figure 4A:
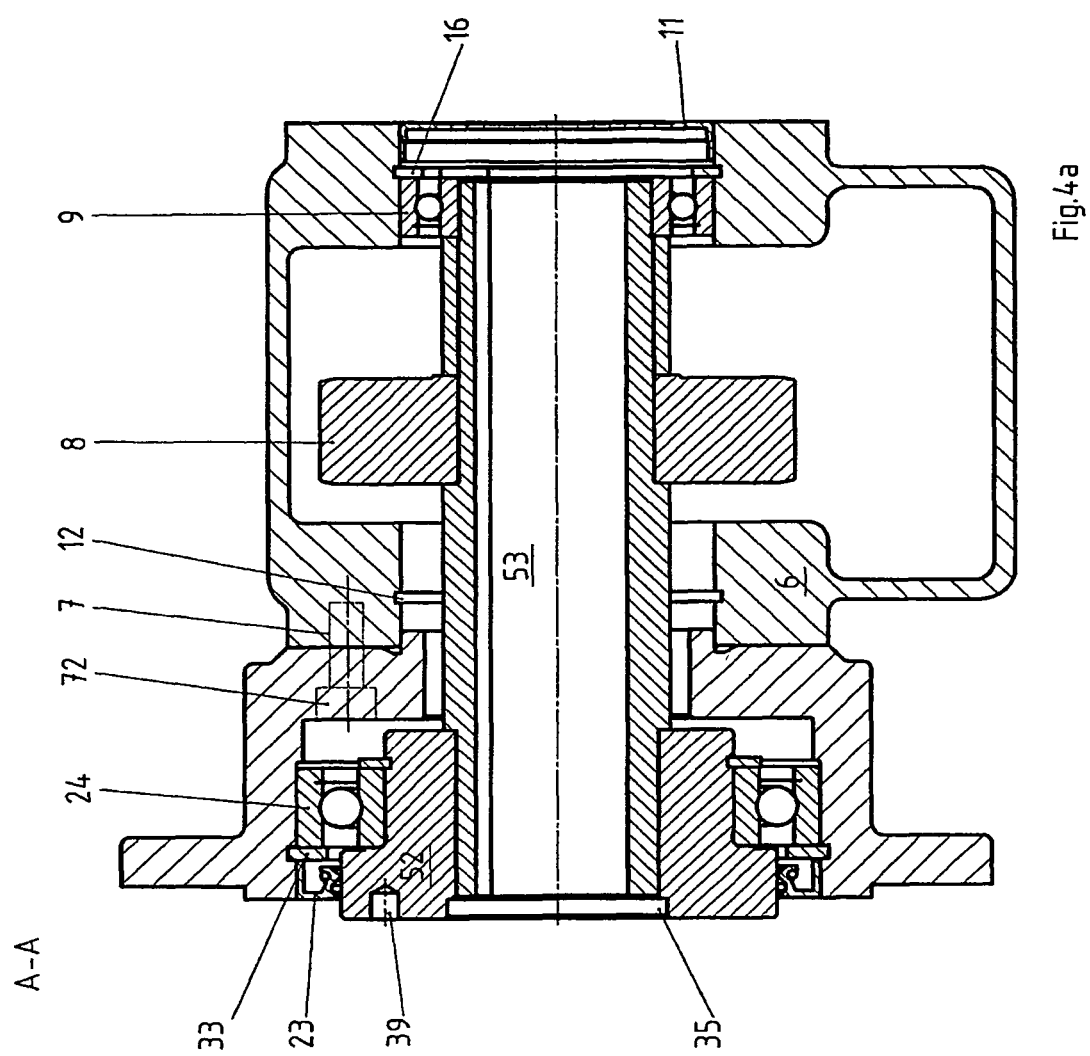

FIGS. 4a, 4b, 4c illustrate a hollow-shaft arrangement. In this case, outgoing shaft 51 of FIGS. 3a, 3b, 3c implemented as a solid shaft is arranged as a hollow shaft, thus the outgoing shaft in hollow-shaft implementation 53. Therefore, such a type of construction may also be offered to the customer, it only being necessary to exchange one part, namely, the shaft. The devices to be connected on the output side are able to be driven by a featherkey connection and/or in the manner described above using the standardized interface.

In FIGS. 1a to 4c, ball roller bearings are illustrated. In the exemplary embodiment illustrated in FIGS. 5a, 5b, 5c, these bearings are also exchangeable for taper roller bearings 54 and 55 on the input and output side. Therefore play may be reduced and the take-up of forces, e.g., axial forces, may be improved.

Connecting tapped holes 7 are encompassed by the interface in housing part 6, and therefore may always be identically implemented. Fastening screws (71, 72) to be screwed into them may be of different length depending on the design.

Example embodiments of the present invention may be suitable for gear units having at least one mitre gear stage, since in that case, the indicated aspect of the smaller overall length needed, e.g., with respect to the installation, may be provided. It may be provided that the overall length, needed in the direction of the outgoing-shaft axis, is small, this not being aligned in the direction of the axis of the electric motor driving the standard gear unit.

In an exemplary embodiment of the present invention according to all the Figures, it may be provided that bearings having high load ratings, such as C&Co characteristic numbers, e.g., higher than conventional and/or in the case of the second variant, are able to be used. In addition, customer shafts having large cross-sections, e.g., larger than conventional and/or in the case of the second variant, are useable. Moreover, the total drive may be more compact than when using a conventional variant, given the same size or model. Furthermore, the output-side power flow, and therefore the entire power-flow collective may be able to be adapted to the requirements on the customer side and optimized. Additionally, a high torque may be able to be delivered on the output side, since the output-side diameter is very much larger than for the other variant.

Given the same size or model and the same requirement of the application on the customer side, using an exemplary embodiment according to the present invention, bearing 24 may have a longer service life, there may be greater flexural fatigue strength of the outgoing shaft and of the shaft on the customer side, a greater resistance to torsion and a higher tilting moment of the outgoing shaft and of the shaft on the customer side.

Operational reliability may be increased when using an exemplary embodiment of the present invention and the cost of the total drive may be reduced because, as a result of the aforementioned aspects hereof, the selection of the variant used may lead to a different result, e.g., to a gear unit of smaller size and therefore considerably lower cost.

In an exemplary embodiment according to the present invention, the outgoing shaft and the shaft on the customer side are able to be more precisely positioned. The connection and the interface may be implemented in extremely compact fashion, and therefore may permit much less unit volume of the total drive. In combination with the changed selection indicated above, a multiplicative effect may result which therefore may lead to an even smaller unit volume accompanied by the associated aspects, such as cost reduction, etc.

Due to the expansion on the output side, the outgoing shaft may be more costly and painstaking to produce than in the case of the second variant. The reason is that a great volume of material may need to be removed, e.g., a great cutting volume may need to be desurfaced and/or turned on a lathe. In addition, the standard gear unit may need to be arranged such that installation in an axial direction is feasible. The indicated bearings and shaft seal rings are also not customary components, but may need to be specially prepared. However, the total drive may become more cost-effective. For example, the aspects mentioned above compensate, e.g., for the indicated higher production costs for outgoing shaft 1. This holds true, e.g., for gear units, driven by electric motors, having an output of approximately 120 W to 200 kW.

Given an existing production series for a standard conventional gear unit, with only a few additional parts, it may be possible to offer an enormous quantity of output-side interfaces to the customer.

Figure 5A:
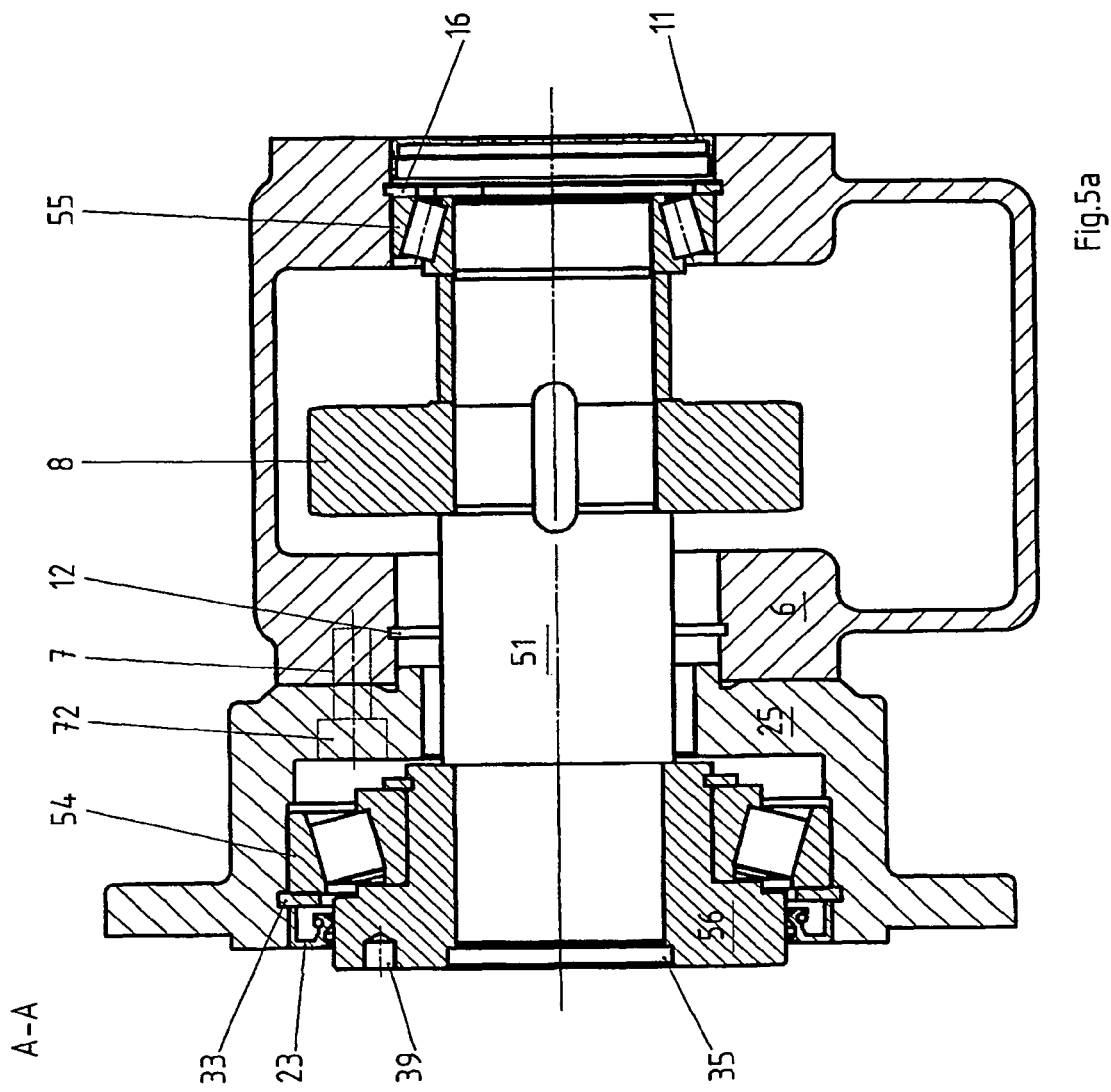
Figure 5C:
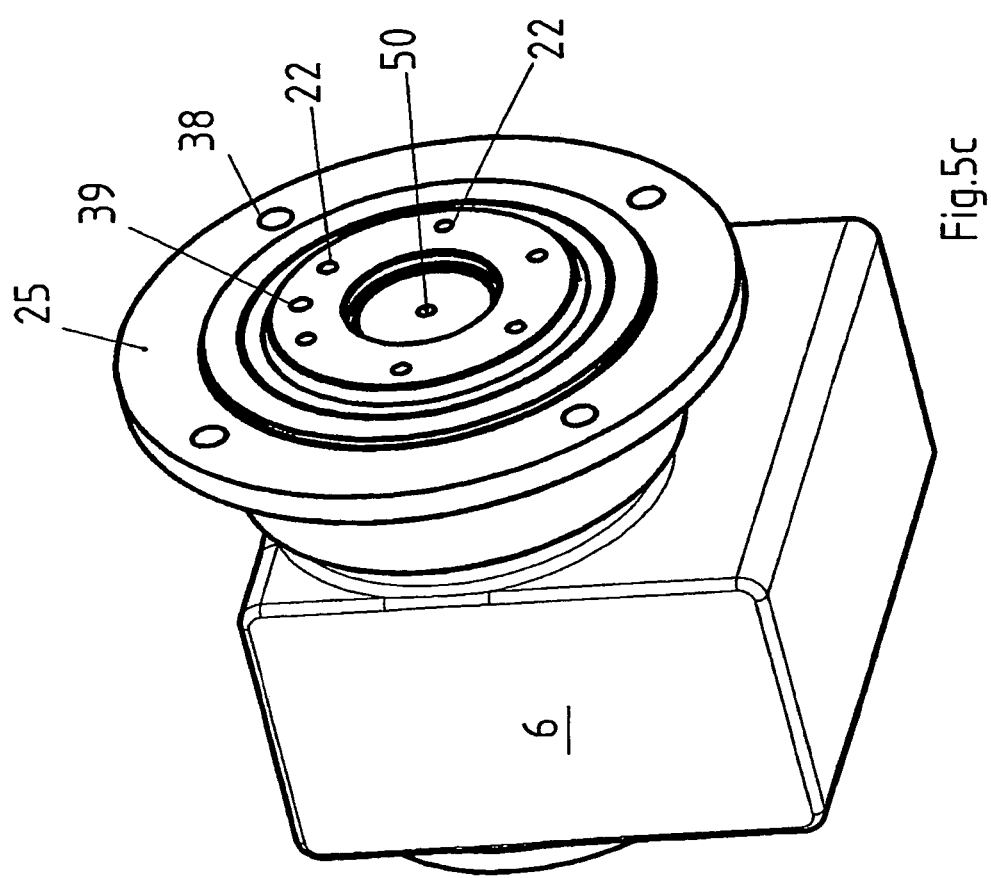

In further exemplary embodiments according to the present invention, the outgoing shaft of the standard gear unit is connected as a second shaft to the flange part, and therefore a first outgoing shaft is produced which is usable as outgoing shaft in exemplary embodiments illustrated in FIGS. 3a, 4a, 5a.

Instead of the releasable connection, including connecting tapped holes 7, different, similarly-acting arrangements may also be provided for producing a connection.

The foregoing is applicable in the case of a drive, e.g., an electric motor, because in it, the rotor shaft, which represents the output in the electric motor, is supported by a bearing in a housing part and is sealed from it by a shaft seal ring. Therefore, given such a standard electric motor from a production series of electric motors, the bearing and the shaft seal ring are again removable, and at this location, corresponding to FIGS. 1a, 1b and 1c, an intermediate flange is usable with flange block output, thus interface in accordance with EN ISO 9409-1. In addition, the rotor shaft may be replaced by a rotor shaft formed differently accordingly on the output side. The features hereof specific to the outgoing shaft are then applicable here as well, thus, the rotor shaft may be implemented in one or two parts on the output side, e.g., is welded.

Consequently, output-side devices which have a corresponding flange block interface, thus interface in accordance with EN ISO 9409-1, are connectable directly to the electric motor. For example, the electric motor is executable as a polyphase motor of the type described in German Published Patent Application No. 100 49 883 or in the manner described in German Published Patent Application No. 102 30 569. In this context, the electric motor is arranged as a rotary electric motor and has windings without coil overlapping in the region of the stator, the features of at least one of the two foregoing documents.

Due to the arrangement of the electric motor as a polyphase motor, a high output-side torque may be available, and in many applications, it may be made possible to even dispense with a gear unit.

In a similar as a gear motor, the electric motor represents a drive. However, to be understood by drive are also compact drives. They include, for example, not only the electric motor, but also a converter, and moreover, in addition a gear unit, at least the electric motor and the converter being arranged in a single surrounding housing. To be understood under the term drive are also converter motors in which the converter rests on the terminal box or is integrated into it.

What is claimed is:

1. A drive, comprising:

at least one housing part;

an outgoing shaft supported in an output-side bearing; and an output-side shaft seal ring configured to seal on an output side;

wherein the output-side shaft seal ring and the output-side bearing are arranged between the outgoing shaft and an intermediate flange, the intermediate flange arranged in the housing part, for positioning, to abut against a bore configured as a bearing seat and seat for the shaft seal ring, the intermediate flange secured to the housing part by a releasable connection separate from the bore configured as the bearing seat and the seat for the shaft seal ring, the intermediate flange machined to include a connection arrangement for connection to a non-rotating part of a device to be driven, a radial distance of the releasable connection to an axis of rotation of the outgoing shaft smaller than a diameter of at least one of:

(a) an inner ring of the output-side bearing;

(b) an outer ring of the output-side bearing; and (c) an inside diameter of the output-side shaft seal ring.

2. The drive according to claim 1, wherein the intermediate flange is secured to the housing part by the releasable connection for transmission of at least one of (a) power and (b) torque.

3. The drive according to claim 1, wherein the connection arrangement includes at least one of (a) drilled holes and (b) tapped holes.

4. The drive according to claim 1, further comprising an electric motor, the outgoing shaft configured as a rotor shaft of the electric motor.

5. The drive according to claim 4, wherein the electric motor is configured as a polyphase motor arranged to directly drive a load.

6. The drive according to claim 4, wherein the electric motor is configured as a polyphase motor arranged to directly drive a load without a gear unit arranged between the electric motor and the load.

* * * * *